(12) United States Patent
Kuroda et al.

(10) Patent No.: US 7,911,689 B2
(45) Date of Patent: Mar. 22, 2011

(54) MICROSCOPE

(75) Inventors: Chikara Kuroda, Ina (JP); Yuko Obuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 496 days.

(21) Appl. No.: 11/994,400

(22) PCT Filed: Sep. 21, 2006

(86) PCT No.: PCT/JP2006/318770
§ 371 (c)(1),
(2), (4) Date: Dec. 31, 2007

(87) PCT Pub. No.: WO2007/034889
PCT Pub. Date: Mar. 29, 2007

(65) Prior Publication Data
US 2009/0122396 A1    May 14, 2009

(30) Foreign Application Priority Data

Sep. 22, 2005   (JP) ................................ 2005-276204
Oct. 20, 2005   (JP) ................................ 2005-305544

(51) Int. Cl.
*G02B 21/00* (2006.01)
(52) U.S. Cl. .................. 359/368; 359/383; 359/385
(58) Field of Classification Search ........... 359/368–390
See application file for complete search history.

(56) References Cited

U.S. PATENT DOCUMENTS

| | | | | |
|---|---|---|---|---|
| 2,942,518 A * | 6/1960 | Brockway | ..................... | 359/389 |
| 4,756,611 A * | 7/1988 | Yonekubo et al. | ............ | 359/370 |
| 5,270,855 A * | 12/1993 | Hasegawa | ..................... | 359/368 |
| 5,668,661 A | 9/1997 | Tomioka | | |
| 6,072,622 A * | 6/2000 | Biber | ............................ | 359/368 |
| 2003/0139736 A1 | 7/2003 | Sander | | |
| 2003/0201378 A1* | 10/2003 | Ishikawa et al. | ........... | 250/201.3 |
| 2005/0117209 A1 | 6/2005 | Moller et al. | | |
| 2005/0231799 A1 | 10/2005 | Kawasaki et al. | | |
| 2006/0116851 A1* | 6/2006 | Utsugi et al. | .................. | 702/166 |

FOREIGN PATENT DOCUMENTS

| | | |
|---|---|---|
| JP | 7-218841 A | 8/1995 |
| JP | 2000-97859 A | 4/2000 |
| JP | 2001-166214 A | 6/2001 |
| JP | 2002-098899 A | 4/2002 |
| JP | 2003-265515 A | 9/2003 |
| JP | 2005-165292 A | 6/2005 |

* cited by examiner

*Primary Examiner* — Thong Nguyen
(74) *Attorney, Agent, or Firm* — Holtz, Holtz, Goodman & Chick, PC

(57) ABSTRACT

A microscope includes an observation optical unit that has a zoom optical system having variable zoom power and an objective lens optically connected to the zoom optical system, the observation optical unit receiving observation light emitted from an observation sample, a focusing unit that has a focusing mechanism to focus the observation optical unit on the observation sample, a light source unit that emits illuminating light to illuminate the observation sample, and an illuminating unit that has a reflecting optical element disposed in the observation optical unit but out of an optical path of the zoom optical system, the illuminating unit being partially disposed in the focusing unit, the illuminating unit illuminating the observation sample with the illuminating light via the reflecting optical element and the objective lens.

13 Claims, 10 Drawing Sheets

MICROSCOPE

This application is a U.S. National Phase Application under 35 USC 371 of International Application PCT/JP2006/318770 filed Sep. 21, 2006.

TECHNICAL FIELD

The present invention relates to microscopes designed to observe a specimen via a zoom optical system having variable zoom power, and more particularly, relates to fluorescent microscopes designed to observe fluorescence emitted from a specimen mounted on a stage.

BACKGROUND ART

In recent years, microscopes used as fluorescent microscopes are widely used not only for microregion observation but also for macroregion observation. Since such microscopes require bright, uniform illumination, near coaxial epi-illumination has come to be used more often, replacing conventional oblique illumination and coaxial epi-illumination.

FIG. 12 is a view showing an example of a stereoscopic microscope as a conventional fluorescent microscope (refer to, for example, Patent Document 1). In this case, a frame 1 is placed on a desk (not shown). On the frame 1 is a specimen 2 mounted as a sample to be observed. The frame 1 has a footplate 101 and a post 102, or a support member, disposed upright on the footplate 101. The post 102 has a focusing unit 3 as a focusing unit. The focusing unit 3 includes a fixed member 301 fixed to the post 102, and a movable member 302 movable relative to the fixed member 301. The movable member 302 is provided with a focusing handle 303. The focusing handle 303 is used for focusing, and moves the movable member 302 vertically along the post 102 according to the rotation of the handle 303 by means of a focusing mechanism, which has a raising/lowering mechanism formed from a rack and pinion (not shown).

Disposed on the movable member 302 is a light-projecting tube 400. Also, disposed at the leading end of the light-projecting tube 400 is a zoom mirror 500 serving as an observing optical unit that has a zoom optical system having variable zoom power. The light-projecting tube 400 has an upper tube 400a and a lower tube 400c disposed parallel to the footplate 101, and a space 400b disposed between the movable member 302 of the focusing unit 3 and the zoom mirror 500. The light-emitting tube 400 is provided with an illuminating unit 7 serving as a light source unit. Illuminating light, serving as excitation light emitted from the illuminating unit 7 is guided to an illuminating optical system 401a in the light-projecting tube 400, and then into the space 400b via an excitation filter 9a. An optical axis L1 of the illuminating light introduced via the illuminating optical system 401a is located in the space 400b. Disposed along the optical axis L1 is an illuminating optical system 401b used to relay the illuminating light further. The light transmitted through the illuminating optical system 401b is reflected by reflecting mirrors 402 and 403. Subsequently, the light is thrown onto the specimen 2 through an objective lens 6 (described below) in near coaxial epi-illumination.

An objective lens 6 is attached to the underside of the lower tube 400c. The objective lens 6 can be focused on the specimen 2 by changing the distance relative to the specimen 2 by moving the lens in the direction of the optical axis of light away from the specimen 2 (i.e., in the direction of an optical axis of observation L2 coinciding with the optical axis of the objective lens 6) by the vertical movement of the light-projecting tube 400 according to the operation of the focusing unit 3. The zoom mirror 500 is disposed in a space between the upper tube 400a and the lower tube 400c. The zoom mirror 500 has a zoom optical system 501 and a zoom handle 502. The zoom optical system 501 is disposed along the optical axis of observation L2, and allows zoom observation of variable power by its being subject to a zoom-power-varying operation according to the rotating operation of the zoom handle 502. Within the leading end of the upper tube 400a is an absorption filter 9b. On this leading end is an imaging optical unit 8 with an imaging lens (not shown) and an eyepiece 801, through which the visual observation of an observation image of the specimen 2 formed by condensing light via the objective lens 6 is possible. In addition, the excitation filter 9a and the absorption filter 9b are disposed in their respective specific positions on a turret 9c disposed in a filter unit 9. The filters 9a and 9b are freely replaceable with other excitation and absorption filters of different optical characteristics.

In such a stereoscopic microscope, the space 400b of the light-projecting tube 400 is defined between the movable member 302 of the focusing unit 3 and the zoom mirror 500. Illuminating light as excitation light from the illuminating unit 7 is transmitted through the illuminating optical system 401b in the space 400b, then passed through the objective lens 6 by the reflecting mirrors 402 and 403, and then thrown onto the specimen 2 via the objective lens 6. Fluorescence emitted from the specimen 2 as a result of the excitation light thrown thereon is passed along the optical axis of observation L2 of the zoom mirror 500 from the objective lens 6, and then guided to the imaging optical unit 8 via the absorption filter 9b, and observed through the eyepiece 801.

On the other hand, Patent Document 2 discloses a fluorescent microscope, the configuration of which is such that the space of a light-projecting tube is defined between a focusing unit and an observing unit, composed of an objective lens and a zoom-power-varying optical system, and an illuminating optical system with a prism is disposed in this space. In this case, light is obliquely thrown onto the specimen from the light-projecting tube by the illuminating optical system and the prism corresponding to the magnification.

Patent Document 1: Japanese Patent Application Laid-Open No. 2001-166214

Patent Document 2: Japanese Patent Application Laid-Open No. 2002-098899

PROBLEMS TO BE SOLVED BY THE INVENTION

However, in the stereoscopic microscope disclosed in Patent Document 1, in order to dispose the reflecting mirror 403 for introducing the illuminating light into the objective lens 6, the lower tube 400c projects between the zoom mirror 500 and the objective lens 6. This forms along the optical axis of observation L2 a dead space in which neither the zoom optical system 501 nor the objective lens 6 can be disposed, which results in a larger microscope. In addition, it is necessary to separately manufacture the zoom mirror 500 and the objective lens 6 and separately attach them to the light-projecting tube 400. This makes attaching or detaching them inefficient and time-consuming. Such a configuration also complicates the microscope.

In addition, in the conventional stereoscopic microscopes described above, the space for accommodating the illuminating optical system is defined between the observing unit and the focusing unit. Accordingly, the observing unit, the space, and the focusing unit are disposed such that they overlap one another as viewed from an observer. This results in a larger system of great depth. An increase in the depth of the system increases the distance to the focusing handle. This significantly degrades handle operability. Further, the larger system requires a desk that is sufficiently deep to place the frame on. In some cases, a special desk needs to be prepared, which may be costly. Further, as the observing unit is supported on the post via the focusing unit and space, the post must have greater mechanical strength, increasing the size of the entire system.

The present invention has been made in view of the drawbacks discussed above. It is therefore an object of the invention to provide a microscope that is small, but excels in operability and workability.

BRIEF SUMMARY OF THE INVENTION

According to one aspect of the present invention, a microscope includes an observation optical unit that has a zoom optical system having variable zoom power and an objective lens optically connected to the zoom optical system, the observation optical unit receiving observation light emitted from an observation sample, a focusing unit that has a focusing mechanism to focus the observation optical unit on the observation sample, a light source unit that emits illuminating light to illuminate the observation sample, and an illuminating unit that has a reflecting optical element disposed in the observation optical unit but out of an optical path of the zoom optical system, the illuminating unit being partially disposed in the focusing unit, the illuminating unit illuminating the observation sample with the illuminating light via the reflecting optical element and the objective lens.

Further, according to another aspect of the present invention, a microscope may further include a microscope main body that holds the observation optical unit such that the observation optical unit is freely attached and detached in a direction perpendicular to an optical axis of the objective lens.

Still further, according to still another aspect of the present invention, in a microscope, the observation sample may have a fluorescent substance, and the illuminating unit may illuminate the observation sample with the illuminating light that excites the fluorescent substance.

Still further, according to still another aspect of the present invention, a microscope may further include a focusing unit that has a focusing mechanism to focus the observation optical unit on the observation sample, wherein the illuminating unit may be partially disposed in the focusing unit.

Still further, according to still another aspect of the present invention, a microscope may further include a post member that is disposed upright in a direction of focusing of the observation optical unit by the focusing unit, the post member supporting the focusing unit such that the focusing unit is freely movable in the direction of focusing, wherein the illuminating unit may be partially disposed in the focusing unit and parallel to the post member.

Still further, according to still another aspect of the present invention, a microscope may further include a post member that has a hollow inside and is disposed upright in a direction of focusing of the observation optical unit by the focusing unit, the post member supporting the focusing unit such that the focusing unit is freely movable in the direction of focusing, wherein the illuminating unit may be partially disposed in the focusing unit and in the hollow.

Still further, according to still another aspect of the present invention, in a microscope, the hollow may be a hollow groove formed in a direction in which the support member is disposed upright, and the illuminating unit may be partially disposed in the focusing unit and in the hollow groove.

Still further, according to still another aspect of the present invention, a microscope may further include a post member that has a long through-hole formed so as to be perpendicular to a direction of focusing of the observation optical unit by the focusing unit and so as to extend in the direction of focusing, the post member being disposed upright in the direction of focusing and supporting the focusing unit such that the focusing unit is freely movable in the direction of focusing, wherein the illuminating unit may be partially disposed in the focusing unit and in the long through-hole.

Still further, according to still another aspect of the present invention, a microscope may further include a synchronizing variable-power mechanism that synchronizes with a zoom-power-varying operation of the zoom optical system, thereby varying a power for an area of illumination of the illuminating light by the illuminating unit.

Still further, according to still another aspect of the present invention, in a microscope, the observation optical unit may have a zooming drive mechanism that zoom drives the zoom optical system, thereby causing the zoom optical system to perform the zoom-power-varying operation, the illuminating unit may have a variable-power lens system capable of varying the power for the area of the illumination and a variable-power drive mechanism variable-power driving the variable-power lens system, thereby causing the variable-power lens system to perform a power-varying illumination operation, and the synchronizing variable-power mechanism may be connected to the zooming drive mechanism and the variable-power drive mechanism, synchronizes with a zooming drive operation of the zooming drive mechanism on the zoom optical system, and thereby causes the variable-power drive mechanism to variable-power drive the variable-power lens system.

Still further, according to still another aspect of the present invention, in a microscope, the zoom optical system may have a zoom movable lens capable of moving in a direction of an optical axis of the zoom optical system, the variable-power lens system may have a variable-power movable lens capable of moving in a direction of an optical axis of the variable-power lens system, the zooming drive mechanism may move the zoom movable lens, thereby causing the zoom optical system to perform the zoom-power-varying operation, the variable-power drive mechanism may move the variable-power movable lens, thereby causing the variable-power lens system to perform the power-varying illumination operation, and the synchronizing variable-power mechanism may cause the variable-power drive mechanism to move the variable-power movable lens according to a degree of movement of the zoom movable lens by the zooming drive mechanism.

Still further, according to still another aspect of the present invention, a microscope may further include a microscope main body that holds the observation optical unit such that the observation optical unit is freely attachable and detachable in a direction perpendicular to the optical axis of the objective lens, and a connecting mechanism that is disposed between the synchronizing variable-power mechanism and the zooming drive mechanism to connect the zooming drive mechanism to the synchronizing variable-power mechanism upon attachment of the observation optical unit to the microscope main body, thereby transmitting the zooming drive operation of the zooming drive mechanism to the synchronizing variable-power mechanism, and to disconnect the zooming drive mechanism from the synchronizing variable-power mechanism upon separation of the observation optical unit from the microscope main body.

Still further, according to still another aspect of the present invention, a microscope may further include a connecting mechanism that is disposed between the synchronizing variable-power mechanism and the zooming drive mechanism to connect the zooming drive mechanism to the synchronizing variable-power mechanism, thereby transmitting the zooming drive operation of the zooming drive mechanism to the synchronizing variable-power mechanism, and a disconnecting mechanism that releases the connection of the zooming drive mechanism and the synchronizing variable-power mechanism by the connecting mechanism.

Figure 1:
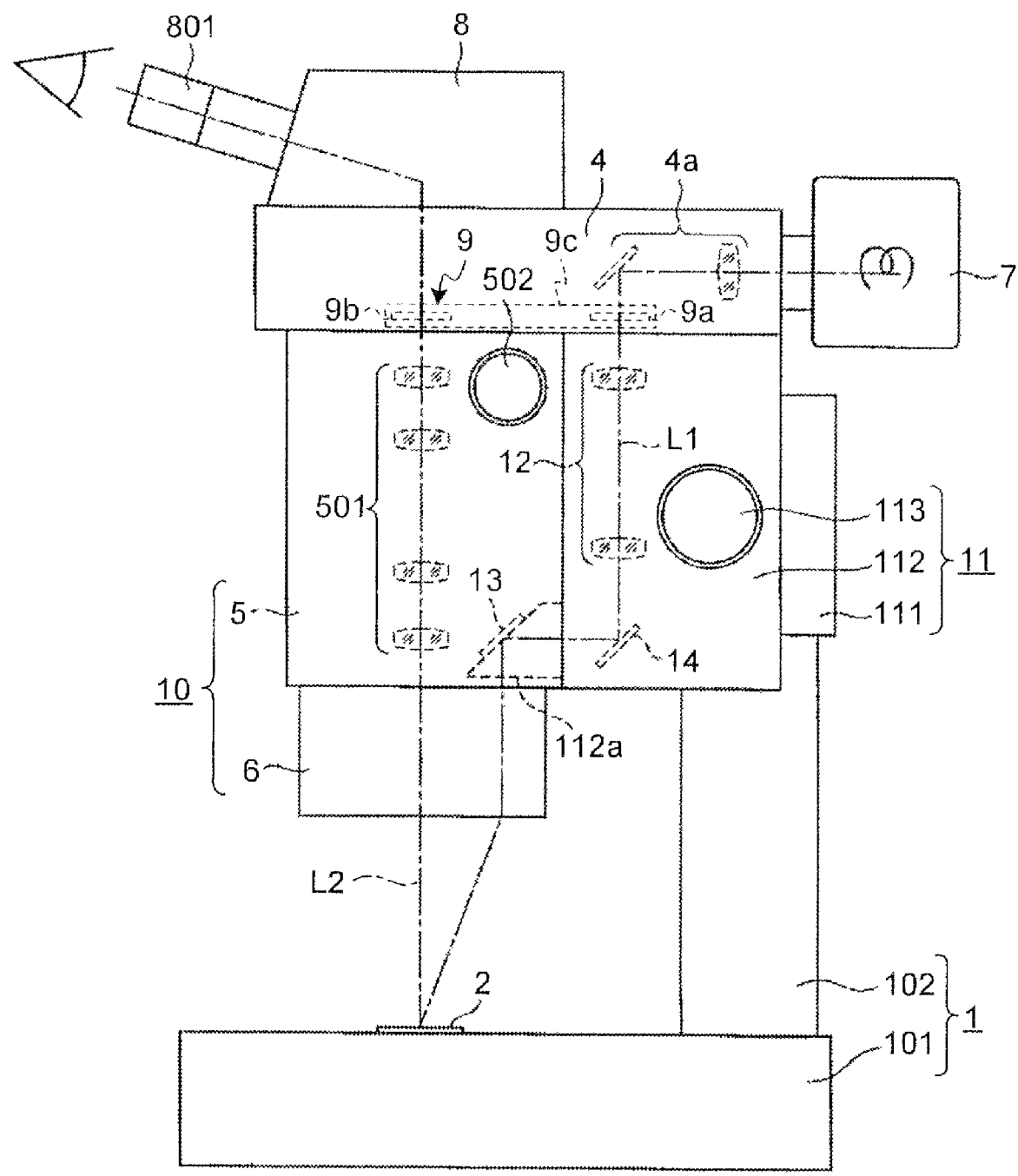
FIG. 1 is a view schematically showing a configuration of a stereoscopic microscope according to a first embodiment of the present invention.

EXPLANATIONS OF LETTERS OR NUMERALS 1 frame, 101 footplate
102 post, 102a groove, 102b through-hole
2 specimen, 3 focusing unit
4 light-projecting tube, 4a illuminating optical system
5 zoom mirror 501 zoom optical system
501a, 501b fixed lens, 501c, 501d movable lens
502 zoom handle, 6 objective lens
7 illuminating unit, 8 imaging optical unit
801 eyepiece, 9 filter unit
9a excitation filter, 9b absorption filter, 9c turret
10 observing optical unit, 11 focusing unit
111 fixed member, 112 movable member
112a projection, 113 focusing handle
12 illuminating optical system, 12a fixed lens
12b movable lens, 13 reflecting mirror
14 reflecting mirror, 21 focusing unit
211 fixed member, 211a hollow, 211b opening
212 movable member, 212a hollow, 212b through-opening
213 focusing handle
25 cylindrical unit, 31 focusing unit
311 fixed member 311a hollow
311b, 311c through-opening, 312 movable member
312a recess, 312b through-opening, 313 focusing handle
32 cylindrical unit 33 illuminating optical system
41 focusing unit, 412 movable member, 413 focusing handle
50 variable-power illuminating mechanism, 51 variable-power drivE mechanism
51a cylindrical groove cam, 51b cam follower component, 51c lens frame
52 illuminating handle
61 zoom drive mechanism, 61a cylindrical groove cam
61b, 61c cam follower component, 61d, 61e lens frame
62 male dovetail 63 connecting member, 63a projection
71 synchronizing variable-power mechanism, 71a, 71b gear
71c timing belt, 72 female dovetail
73 shaft, 74 connecting member, 74a groove, 74b slit
75 notch, 80 screw, 81a, 81b pin, 82 driver
83 bracket, 83a notch
831 screw hole, 832, 833 hole
L1 optical axis, L2 optical axis of observation, L3 optical axis

BEST MODES FOR CARRYING OUT THE INVENTION

Referring to the accompanying drawings, there will be described embodiments of the present invention.

First Embodiment

Figure 12:
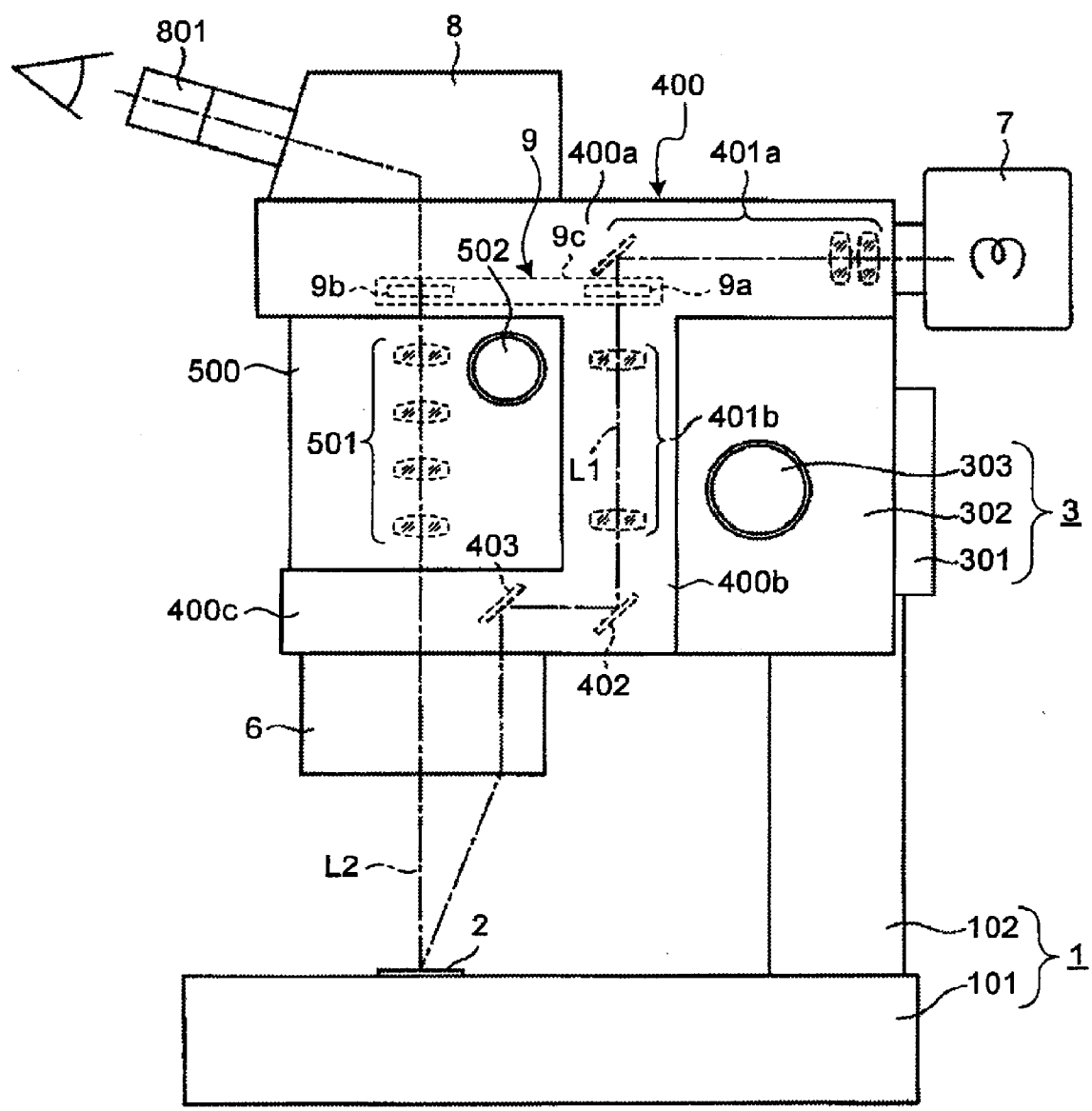
FIG. 12 is a view schematically showing a configuration of a conventional stereoscopic microscope.

FIG. 1 is a view schematically showing a configuration of a stereoscopic microscope according to the first embodiment of the present invention. Reference numerals identical to FIG. 12 are used in the description of components or the like that are also identical to those shown in FIG. 12, and explanations thereof are not repeated.

A fixed member 111 for a focusing unit 11, as a focusing unit, is disposed on a post 102, as a post member, disposed upright on a footplate 101 of a frame 1. A movable member 112 having a light-projecting tube 4 attached thereto is mounted on the fixed member 111 so as to be movable. The movable member 112 has a focusing handle 113. The focusing handle 113 is used for focusing. The focusing handle 113 is designed such that, according to the rotating operation of the focusing handle, the movable member 112 is vertically moved along the post 102 in relation to the fixed member 111 by a focusing mechanism, which has a raising/lowering mechanism formed from a rack and pinion (not shown). Extending through the length of the movable member 112 is an optical axis L1 of illuminating light introduced via an illuminating optical system 4a and an excitation filter 9a disposed in the light-projecting tube 4. The optical axis L1 follows the same direction as the post 102 but falling between a zoom mirror 5 and the post 102. Disposed along the optical axis L1 is an illuminating optical system 12 used to guide the illuminating light, which serves as excitation light, to an objective lens 6. Disposed adjacent to the movable member 112 is the zoom mirror 5 attached to the leading end of the light-projecting tube 4 and incorporating a zoom optical system 501. The leading end of the light-projecting tube 4 and the zoom mirror 5 are directly connected by a connecting mechanism such as a dovetail structure (not shown).

A projection 112a extends from the side of the movable member 112 adjacent to the zoom mirror 5. The projection 112a is located within the zoom mirror 5. A reflecting mirror 13 is attached to the leading end of the projection 112a inclined at a predetermined angle. Thus, the reflecting mirror 13 is disposed out of the optical path of the zoom optical system 501 within the zoom mirror 5. The reflecting mirror 13 is positioned such that the illuminating light transmitted through the illuminating optical system 12 in the movable member 112 and then reflected by a reflecting mirror 14 is further reflected in the direction of the optical axis of the objective lens 6, i.e., in the direction of the optical axis of observation L2. The reflecting mirror 13 illuminates the illuminating light, through the objective lens 6, on a specimen 2 in a near coaxial epi-illumination. The objective lens 6 is directly attached to the zoom mirror 5 so as to be freely replaceable. Also, the objective lens 6 is optically connected to the zoom optical system 501 disposed in the zoom mirror 5. The integrally connected zoom mirror 5 and objective lens 6 compose an observing optical unit 10. The other features of this configuration of the microscope are identical to those of the conventional microscope shown in FIG. 12.

In such a configuration, illuminating light emitted from an illuminating unit 7 as excitation light is guided to the illuminating optical system 12 in the movable member 112 via the illuminating optical system 4a and the excitation filter 9a in the light-projecting tube 4, then passed through the illuminating optical system 12, then reflected by the reflecting mirrors 14 and 13, and thrown onto the specimen 2 through the objective lens 6 in a near coaxial epi-illumination. That is to say, the illuminating optical systems 4a and 12 and the reflecting mirrors 13 and 14 compose a near coaxial epi-illuminatory optical system, which functions as an illuminating unit. In this case, when the focusing handle 113 for focusing is rotated, the movable member 112 is vertically moved in relation to the fixed member 111 in accordance with the rotating operation such that the illuminating optical system 12 and the reflecting mirrors 14 and 13 are also moved in the direction of the optical axis L1 along with the movement of the movable member 112. Accordingly, the illuminating light guided into the illuminating optical system 12 is stably guided to the objective lens 6 via the reflecting mirrors 14 and 13.

Subsequently, fluorescence, or observation light, emitted from a specimen 2 according to excitation light with which the specimen 2 has been illuminated, is guided, via the objective lens 6, the zoom mirror 5, and an absorption filter 9b, up to an imaging optical unit 8, where an observation image of the specimen 2 is formed to be observed through an eyepiece 801.

As has thus been described, the stereoscopic microscope according to the first embodiment includes the observing optical unit 10 that has the zoom optical system 501 having variable zoom power, and the objective lens 6 optically connected to the zoom optical system 501, and that receives fluorescence, as observation light, emitted from the specimen 2. The stereoscopic microscope also includes a near co-axial epi-illuminatory optical system that has the reflecting mirror 13 disposed in the observing optical unit 10 but out of the optical path of the zoom optical system 501, and that illuminates the specimen 2 with illuminating light emitted from the illuminating unit 7 via the reflecting mirror 13 and objective lens 6. This makes it possible to realize near coaxial epi-illumination for the specimen 2 without providing a space in which the reflecting mirror 13 is disposed between the zoom mirror 5 and the objective lens 6. Accordingly, in this stereoscopic microscope, the zoom optical system 501, etc., can be efficiently disposed without forming a dead space between the zoom mirror 5 and objective lens 6 in the direction of the optical axis of observation L2. This reduces the size of the microscope. In addition, since the zoom mirror 5 and the objective lens 6 are directly connected and integrated as the observing optical unit 10, the observing optical unit 10 can be quickly and efficiently attached to or detached from the light projecting tube 4, the focusing unit 11, and so on, which compose the microscope main body, as opposed to a case where the zoom mirror 5 and the objective lens 6 are separately attached to or detached from the light projecting tube 4, etc. Such an integrated configuration of the observing optical unit 10 further simplifies the configuration of the microscope.

Further, the illuminating optical system 12 for guiding illuminating light from the illuminating unit 7 is disposed within the movable member 112 of the focusing unit 11. This makes it possible to dispose the movable member 112 and the zoom mirror 5 adjacent to each other such that the conventional need for a space for a light-projecting tube interposed between the movable member and the zoom mirror, is obviated. Thus, since only the zoom mirror 5 and the focusing unit 11 are disposed in the same direction as viewed from the observer side, the depth of the microscope is significantly decreased and hence the system can be made more compact. The decrease in the depth reduces the distance from an observer to the focusing handle 113 of the focusing unit 11, extending the range an observer's hand may reach, and thus improving operability. Further, a smaller system makes it easy to place the frame 1 on a desk or the like, thus allowing the use of a desk of short depth, which eliminates the need for a special desk for the microscope and is cheaper. Further, since the post 102 directly supports the zoom mirror 5 via the focusing unit 11, mechanical strength can be minimized, which also makes the microscope smaller. Such a simple configuration in which the illuminating optical system 12 is disposed and integrated in the movable member 112 reduces the cost of the microscope. The integrated structure improves the rigidity of the microscope. Simplifying the microscope into the form of a unit by such an integrated structure allows, for example, easier combination of the microscope with another unit or units, which leads to improved systems overall.

In the first embodiment described above, the illuminating optical system 12 is disposed along the post 102 between the post 102 and the zoom mirror 5. However, the illuminating optical system 12 may alternatively be disposed along the post 102 so as to be opposite to the zoom mirror 5, with the post 102 between them. This makes it possible to more effectively utilize a dead space below the illuminating unit 7, thereby further reducing the size of the microscope.

Second Embodiment

Figure 2:
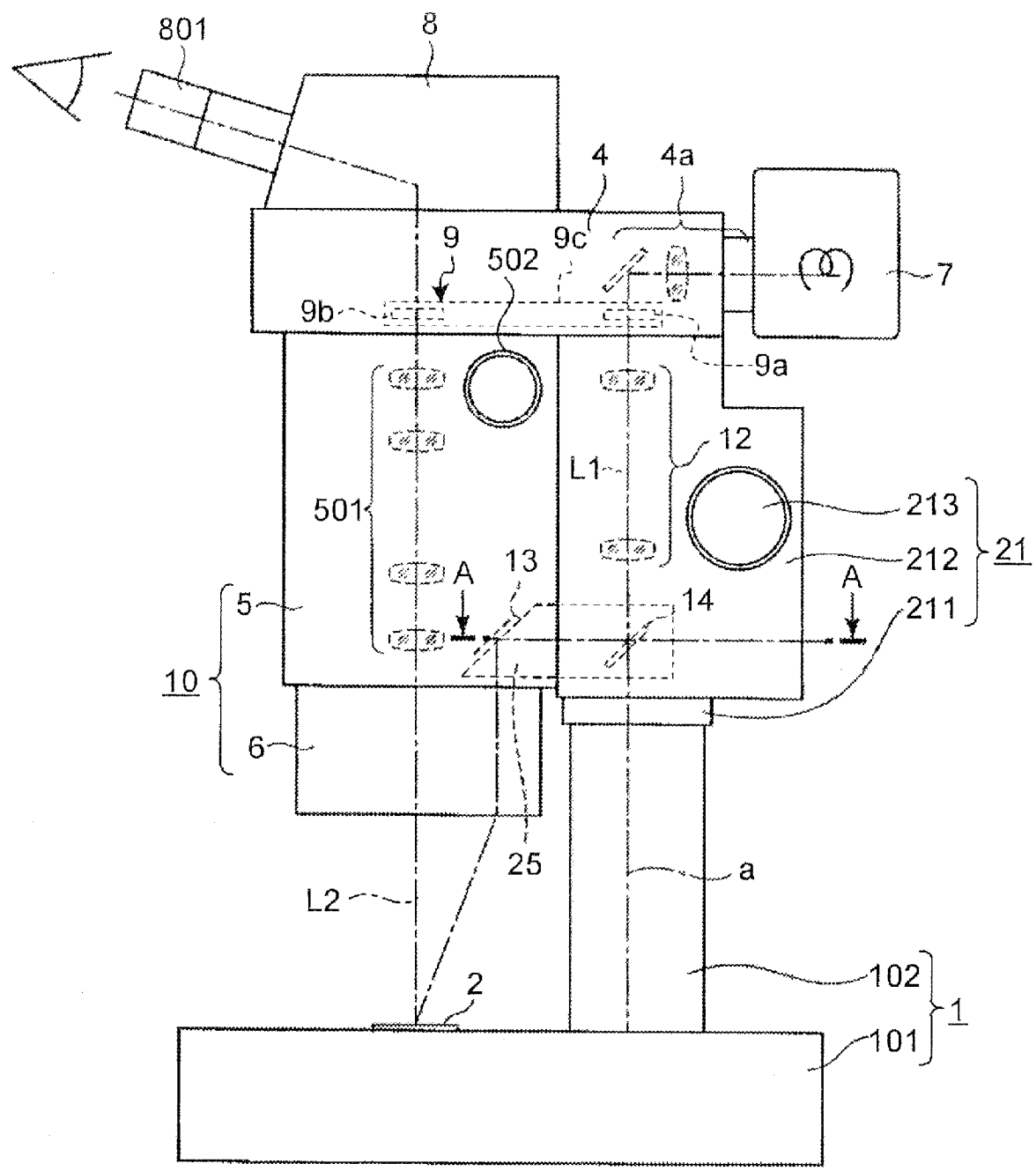
FIG. 2 is a view schematically showing a configuration of a stereoscopic microscope according to a second embodiment of the present invention.

Next, the second embodiment according to the present invention will be described. FIG. 2 is a view schematically showing the configuration of a stereoscopic microscope according to the second embodiment of the present invention.

Reference numerals identical to FIG. 1 are used in the description of components or the like that are identical to those shown in FIG. 1, and explanations thereof are not repeated.

A fixed member 211 for a focusing unit 21 is fixed on a post 102 disposed upright on the footplate 101 of a frame 1. Disposed in a movable manner on the fixing member 211 is a movable member 212 to which a light-projecting tube 4 is attached.

Figure 3:
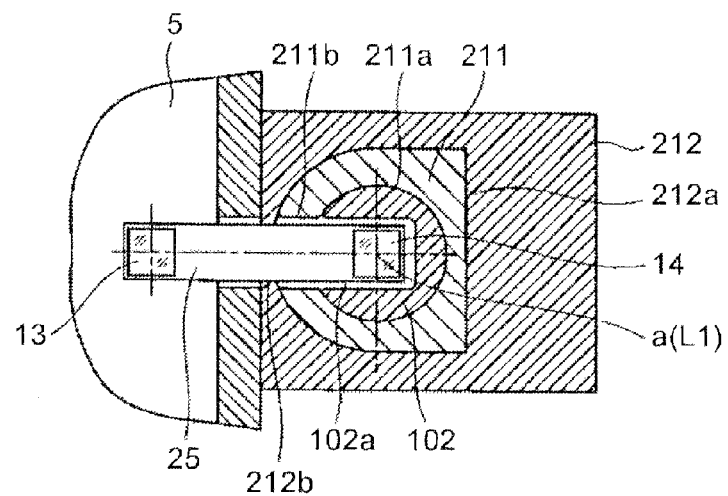
FIG. 3 is a cross-sectional view taken along line A-A shown in FIG. 2.

Within the post 102 and in the front of the focusing unit 21 (on the left in FIG. 2) is a U-shaped cross sectional groove 102a formed along the central axis a, as shown in FIG. 3 (a cross-sectional view taken along the line A-A of FIG. 2). The fixed member 211 has a hollow 211a in which the post 102 is inserted. Formed in one side of the fixed member 211 is an opening 211b communicating with the opening of the groove 102a and reaching the hollow 211a; the opening 211b extends along the central axis a. Also, the movable member 212 has a hollow 212a in which the fixed member 211 is inserted. Formed in one side of the movable member 212 is a through-opening 212b communicating with the opening 211b of the fixed member 211 and reaching the hollow 212a.

Referring back to FIG. 2, a focusing handle 213 is disposed on the movable member 212. The focusing handle 213 is used for focusing. The focusing handle 213 is designed such that, by rotating the focusing handle, the movable member 212 is vertically moved along the post 102 with respect to the fixed member 211 by a focusing mechanism, which has a raising/lowering mechanism formed from a rack and pinion (not shown).

Along the groove 102a of the post 102 runs the optical axis L1 of illuminating light introduced via an illuminating optical system 4a disposed in the light-projecting tube 4. The optical axis L1 follows the central axis a of the post 102 along the groove 102a. Disposed along the optical axis L1 are the illuminating optical system 12 and the reflecting mirror 14 used to guide the illuminating light to the objective lens 6. In this case, the reflecting mirror 14 is disposed within a cylindrical unit 25 inserted in the through-opening 212b of the movable member 212. The cylindrical unit 25 is disposed horizontally such that one end of the cylindrical unit 25 is located in the groove 102a of the post 102 via the opening 211b of the fixed member 211 and the other end is inserted in the zoom mirror 5. The reflecting mirror 14 is disposed in the end located in the groove 102a of the post 102, and the reflecting mirror 13 is disposed at a predetermined angle at the end inserted in the zoom mirror 5. The illuminating light transmitted through the illuminating optical system 12 is reflected by the reflecting mirror 14 and guided to the reflecting mirror 13 through the cylindrical unit 25. That is to say, after the reflecting mirror 14 reflects the illuminating light from the illuminating optical system 12, the reflecting mirror 13 further reflects this illuminating light in the direction of the optical axis of the objective lens 6 (i.e., along the observing optical axis L2) and illuminates the specimen 2 through the objective lens 6 in near coaxial epi-illumination.

The other features of the configuration are identical to those shown in FIG. 1.

In the foregoing configuration, illuminating light emitted from the illuminating unit 7 as excitation light is guided to the illuminating optical system 12 in the groove 102a of the post 102 via the illuminating optical system 4a and an excitation filter 9a in the light-projecting tube 4, then passed through the illuminating optical system 12, then reflected by the reflecting mirrors 14 and 13, and thrown onto the specimen 2 through the objective lens 6 in near coaxial epi-illumination. As in the first embodiment, when the focusing handle 213 is rotated, the focusing mechanism with the raising/lowering mechanism composed of the rack and pinion (not shown) vertically moves the movable member 212 with respect to the fixed member 211 according to rotation. In this case, the cylindrical unit 25 is also vertically moved along with the movement of the movable member 212 along the groove 102a of the post 102 such that the reflecting mirrors 13 and 14 are also moved in the direction of the optical axis L1 in relation to the illuminating optical system 12. Accordingly, the illuminating light introduced into the illuminating optical system 12 is stably guided to the objective lens 6 via the reflecting mirrors 13 and 14.

Subsequently, fluorescence, or observation light, emitted from the specimen 2 according to excitation light with which the specimen 2 is irradiated, is guided, via the objective lens 6, a zoom mirror 5, and an absorption filter 9b, up to the imaging optical unit 8, where an observation image of the specimen 2 is formed for observation through the eyepiece 801.

Accordingly, the second embodiment provides effects similar to those of the first embodiment. In addition, since the illuminating optical system 12 for guiding illuminating light from the illuminating unit 7 is disposed in the post 102, that is, along the groove 102a, the optical length of the illuminating optical system 4a for guiding a luminous flux from the illuminating unit 7 to the illuminating optical system 12 can be reduced. This minimizes light loss along the optical path and ensures a supply of brighter illuminating light. Since the depth of the light-projecting tube 4 can also be reduced, the system can be made smaller. Further, since the illuminating optical system 12 and the post 102 do not need to be disposed parallel to each other in the focusing unit 21, the focusing unit 21 can be made smaller. Moreover, disposing the illuminating optical system 12 within the post 102 allows a space below the illuminating unit 7, in which the movable member 212, focusing handle 213, etc. which compose part of the focusing unit 21 can be disposed. This makes it possible to make effective use of the dead space below the illuminating unit 7 and thus make the system more compact.

Third Embodiment

Figure 4:
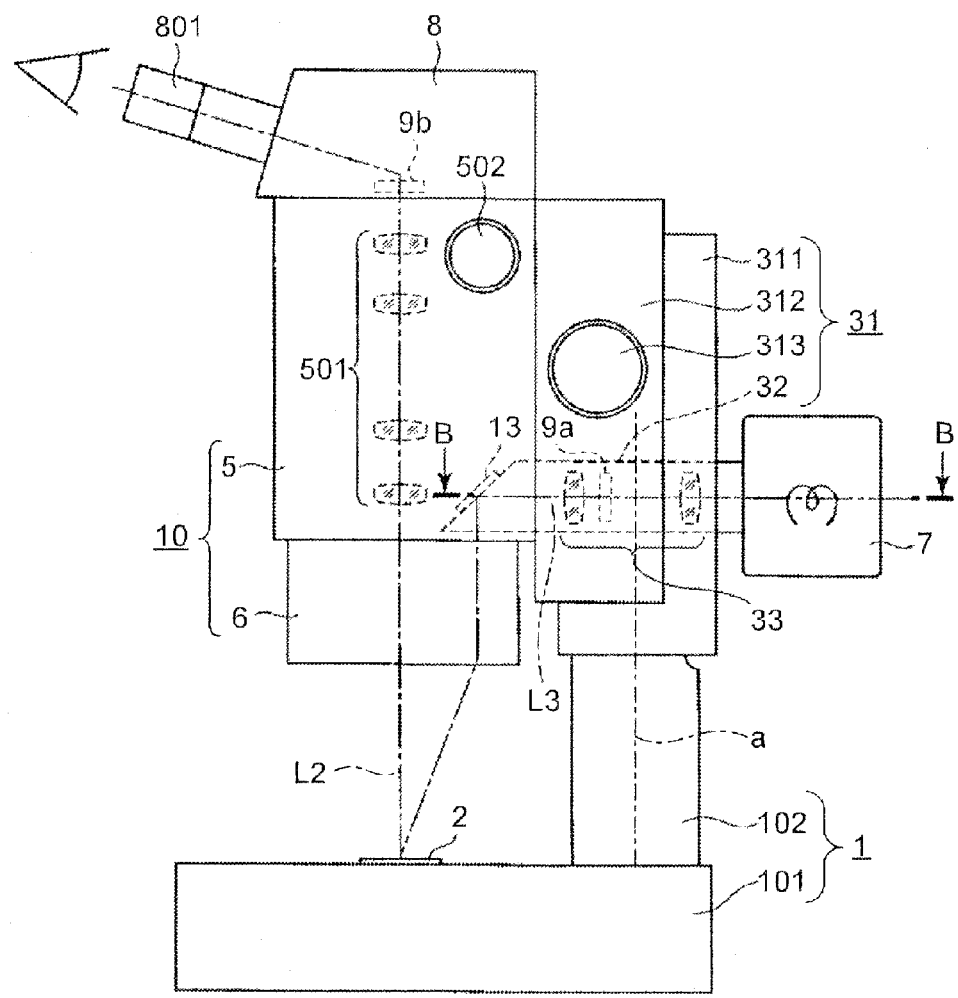
FIG. 4 is a view schematically showing a configuration of a stereoscopic microscope according to a third embodiment of the present invention.

The third embodiment according to the present invention will now be described below. FIG. 4 is a view schematically showing the configuration of a stereoscopic microscope according to the third embodiment of the present invention. Reference numerals identical to FIG. 1 are used in the description of components or the like that are identical to those shown in FIG. 1, and explanations thereof are not repeated.

Figure 5A:
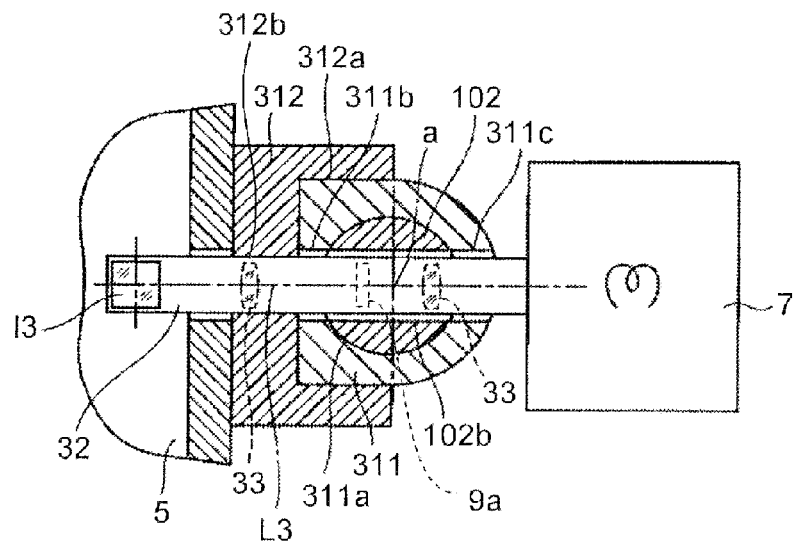
FIG. 5A is a cross-sectional view taken along line B-B shown in FIG. 4.
Figure 5B:
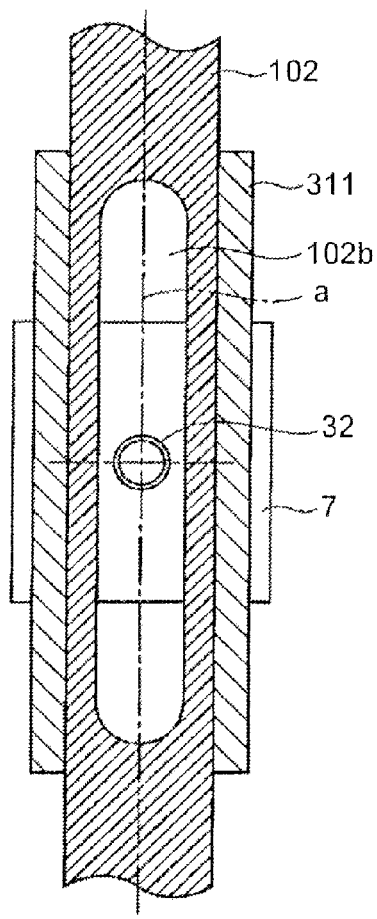
FIG. 5B is a vertical-sectional view of a post shown in FIG. 4.

A fixed member 311 for a focusing unit 31 is fixed on a post 102 disposed upright on a footplate 101 of a frame 1. A movable member 312 is disposed so as to be movable with respect to the fixed member 311. Formed in the part of the post 102 corresponding to the focusing unit 31, is a through-hole 102b, which is perpendicular to the central axis a, that is, the direction of focus of a focusing unit 31, as shown in FIG. 5A (a cross-sectional view taken along the line B-B of FIG. 4) and FIG. 5B (a vertical-sectional view of the post 102). The through-hole 102b extends in the direction of the central axis a in the shape of a long hole. The fixed member 311 has a hollow 311a in which the post 102 is inserted. Through-openings 311b and 311c are formed in the sidewalls of the fixed member 311 along the central axis a so as to communicate with the openings of the through-hole 102b and extend to the hollow 311a. The movable member 312 has a recess 312a in which the fixed member 311 fits. Also formed in one side of the movable member 312 is a through-opening 312b communicating with the through-opening 311b of the fixed member 311 and reaching the bottom of the recess 312a.

Referring back to FIG. 4, the movable member 312 has a focusing handle 313. The focusing handle 313 is used for focusing. The focusing handle 313 is designed such that, by rotating the focusing handle, the movable member 312 is vertically moved along the post 102 with respect to the fixed member 311 by a focusing mechanism, which has a raising/lowering mechanism formed from a rack and pinion (not shown). Disposed adjacent to the movable member 312 is a zoom mirror 5. In this case, the movable member 312 and the zoom mirror 5 are directly connected by a connecting mechanism such as a dovetail structure (not shown).

A cylindrical unit 32 serving as a light-projecting tube is inserted in the through-opening 312b of the movable member 312. The cylindrical unit 32 is disposed in a direction perpendicular to the post 102 (in this embodiment, in a horizontal direction) such that one end of the cylindrical unit 32 is located outside via the though-openings 311b and 311c of the fixed member 311 and the through-hole 102b of the post 102, and the other end thereof in the zoom mirror 5.

Disposed at one end of the cylindrical unit 32 is a light source, namely an illuminating unit 7. Within the cylindrical unit 32 are an illuminating optical system 33 and an excitation filter 9a, which guide illuminating light from the illuminating unit 7 to the objective lens 6 along an optical axis L3 of the illuminating light. Disposed at the other end of the cylindrical unit 32, inserted in the zoom mirror 5, is a reflecting mirror 13 inclined at a predetermined angle. The reflecting mirror 13 is positioned such that illuminating light transmitted through the illuminating optical system 33 in the cylindrical unit 32 is reflected in the direction of the optical axis of an objective lens 6, that is, in the direction of an optical axis of observation L2, and thrown onto a specimen 2 through the objective lens 6 in near coaxial epi-illumination. An absorption filter 9b is disposed on the optical axis of observation L2 within an imaging optical unit 8.

The other features of the configuration are identical to those shown in FIG. 1.

In the foregoing configuration, illuminating light emitted from the illuminating unit 7 as excitation light is guided to the reflecting mirror 13 via the illuminating optical system 33 and excitation filter 9a in the cylindrical unit 32, then reflected by the reflecting mirrors 13, and thrown onto the specimen 2 through the objective lens 6 in near coaxial epi-illumination. As in the first and the second embodiments, when the focusing handle 313 for focusing is rotated, a focusing mechanism with a raising/lowering mechanism composed of a rack and pinion (not shown), vertically moves the movable member 312 with respect to the fixed member 311 according to rotation. In this case, the cylindrical unit 32 is also vertically moved together with the movable member 312 along the through-hole 102b of the post 102 such that the illuminating optical system 33 and the excitation filter 9a are also vertically moved together with the illuminating unit 7. Accordingly, the illuminating light introduced into the illuminating optical system 33 is stably guided to the objective lens 6 via the reflecting mirror 13.

Subsequently, fluorescence, or observation light, emitted from the specimen 2 according to excitation light with which the specimen 2 is illuminated is guided, via the objective lens 6 and the zoom mirror 5, up to the imaging optical unit 8, where an observation image of the specimen 2 is formed through the absorption filter 9b so as to be observed through an eyepiece 801.

Accordingly, the third embodiment provides effects similar to those of the first embodiment. In addition, since the cylindrical unit 32 incorporating the illuminating optical system 33 and the excitation filter 9a is of straight configuration, the optical path can be shortened, which minimizes light loss along the optical path and ensures a supply of brighter illuminating light. Also, since the shape of the unit can be made simpler, the system performance improves. Further, directly attaching the illuminating unit 7 to the cylindrical unit 32 eliminates the formation of projections above or behind the focusing unit 3, thus downsizing the system. A decrease in the number of optical elements such as reflecting mirrors leads to a simpler configuration and hence lower costs.

Fourth Embodiment

Figure 6:
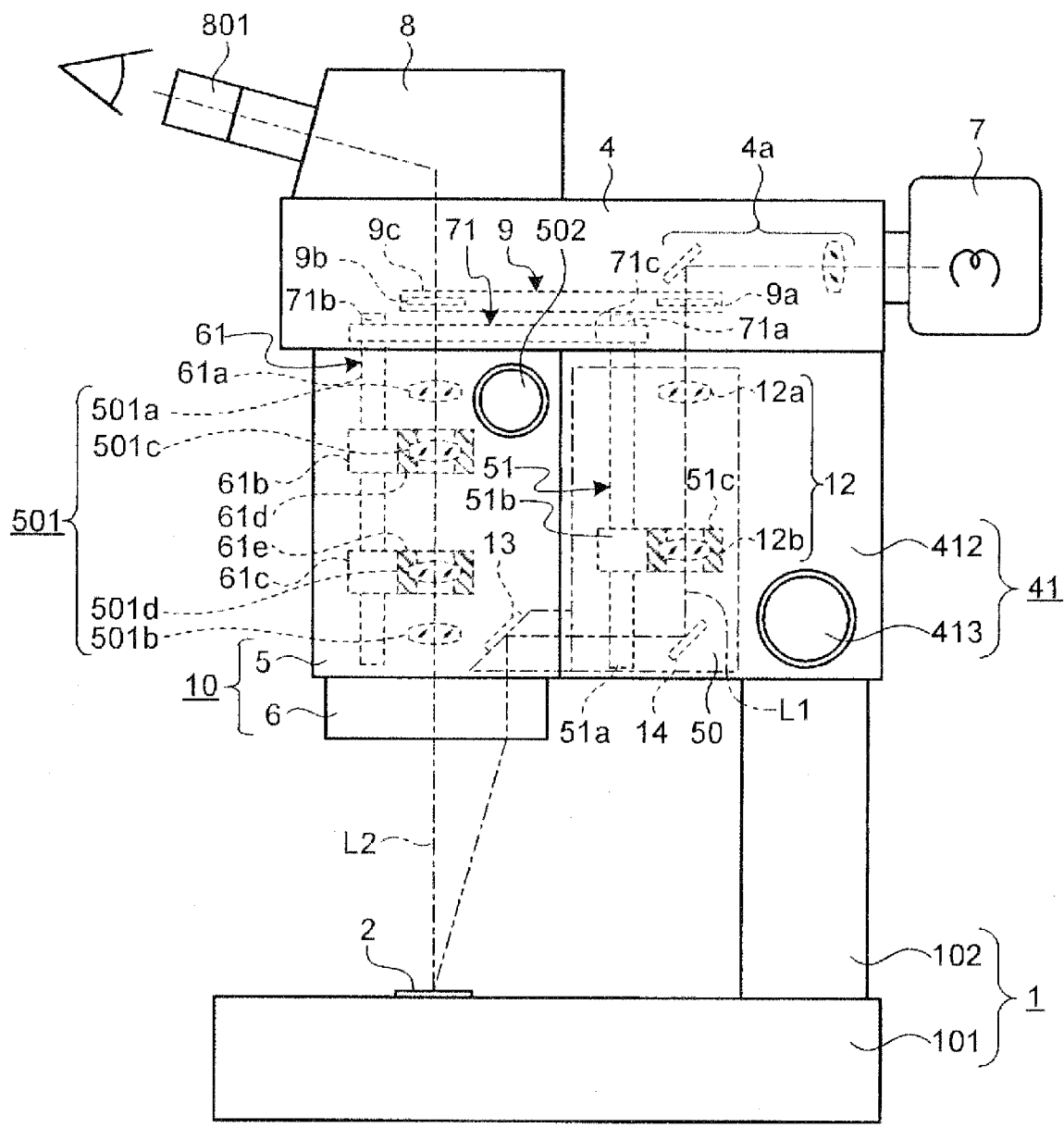
FIG. 6 is a view schematically showing a configuration of a stereoscopic microscope according to a fourth embodiment of the present invention.

The fourth embodiment will now be explained. FIG. 6 is a view schematically showing the configuration of a stereoscopic microscope according to the fourth embodiment of the present invention. Reference numerals identical to FIG. 1 are used in the description of components or the like that are identical to those shown in FIG. 1, and explanations thereof are not repeated.

As shown in FIG. 6, on a post 102 disposed upright on a footplate 101 of a frame 1 is a movable member 412 for a focusing unit 41. The movable member 412 is freely movable vertically along the post 102 according to the rotating operation of a focusing handle 413 by a focusing mechanism with a raising/lowering mechanism composed of a rack and pinion (not shown). A light-projecting tube 4 is mounted on the focusing unit 41.

The stereoscopic microscope according to the fourth embodiment incorporates a variable-power illuminating mechanism 50 formed in conjunction with an illuminating optical system 12, which serves as a variable-power lens system, and a variable-power drive mechanism 51, which is provided for the illuminating optical system 12. The illuminating optical system 12 includes a fixed lens 12a and a movable lens 12b. The movable lens 12b is held by a lens frame 51c. Attached to the lens frame 51c is a cam follower component 51b composing the variable-power drive mechanism 51 together with a cylindrical groove cam 51a (described below). The cylindrical groove cam 51a is screwed into the cam follower component 51b. The cylindrical groove cam 51a is disposed along an optical axis L1, and vertically moves the movable lens 12b along the optical axis L1 via the cam follower component 51b by its being rotated along its circumference.

Within a zoom mirror 5 is a zooming drive mechanism 61 driving a zoom optical system 501. The zoom optical system 501 includes fixed lenses 501a and 501b and movable lenses 501c and 501d mounted along an optical axis of observation L2. The movable lenses 501c and 501d are held by lens frames 61d and 61e respectively. Attached to the lens frames 61d and 61e are cam follower components 61b and 61c, respectively, composing the zooming drive mechanism 61 together with a cylindrical groove cam 61a (described below). The cylindrical groove cam 61a is screwed into the cam follower components 61b and 61c. The cylindrical groove cam 61a is disposed along the optical axis of observation L2, and connected to a zoom handle 502 via a transmission gear (not shown). The cylindrical groove cam 61a vertically moves the movable lenses 501c and 501d in opposite directions along the optical axis of observation L2 via the cam follower components 61b and 61c respectively, by its being rotated by the rotating operation of the zoom handle 502.

In this case, the leading end (i.e., the upper end, in FIG. 6) of the cylindrical groove cam 51a of the variable-power drive mechanism 51 is located in the hollow of the light-projecting tube 4, and a gear 71a is attached to the leading end. Similarly, the leading end (i.e., the upper end, in FIG. 6) of the cylindrical groove cam 61a of the zooming drive mechanism 61 is located in the hollow of the light-projecting tube 4, and a gear 71b is attached to the leading end. Within the hollow of the light-projecting tube 4 is a timing belt 71c extending between the gears 71a and 71b. The gears 71a and 71b and the timing belt 71c transmit the rotating driving force of the cylindrical groove cam 61a, which corresponds to the rotating operation of the zoom handle 502, to the cylindrical groove cam 51a of the variable-power illuminating mechanism 50. In this case, the gears 71a and 71b respond to a zoom-power-varying operation (corresponding to the rotating operation of the cylindrical groove cam 61a) of the zoom optical system 501, from a lower power to a higher power, such that rotation for setting the optimum range of illumination by the illuminating optical system 12 is transmitted to the cylindrical groove cam 51a. Thus, a synchronizing variable-power mechanism 71 is configured so that, in synchronization with the zoom-power-varying operation of the zoom optical system 501 of the zoom mirror 5, the range in which the specimen 2 is illuminated is zoom-varied according to the illuminating optical system 12 of the variable-power illuminating mechanism 50.

The other features of the configuration are identical to those shown in FIG. 1.

In order to observe a specimen 2 at low powers of magnification, an observer rotates the zoom handle 502, thereby rotating the cylindrical groove cam 61a such that one movable lens 501c is moved upward and the other movable lens 501d downward. Consequently, the zoom mirror 5 is set at low magnification, allowing for observation at low magnification. At this time, the rotation of the cylindrical groove cam 61a is transmitted to the timing belt 71c via the gear 71b, and further to the cylindrical groove cam 51a via the gear 71a. Consequently, the cylindrical groove cam 51a is rotated, and the movable lens 12b is moved downward such that magnification is varied to widen the area across which the specimen 2 is illuminated. Accordingly, the entire observable visual field is illuminated brightly.

To observe the specimen at high powers of magnification, on the other hand, an observer rotates the zoom handle 502 in the reverse direction to that assigned for observation at low magnification, thereby rotating the cylindrical groove cam 61a such that one movable lens 501c is moved downward and the other movable lens 501d upward. Consequently, the zoom mirror 5 is set at high magnification, allowing for observation at high magnification. At this time, the rotation of the cylindrical groove cam 61a is transmitted to the timing belt 71c via the gear 71b and further transmitted to the cylindrical groove cam 51a via the gear 71a. As a result, the cylindrical groove cam 51a is rotated in the reverse direction to that for observation at low magnification such that the movable lens 12b is moved upward. Accordingly, the illuminating light thrown onto the specimen 2 is condensed into a spot, the area of illumination of the specimen 2 is narrowed by varying degrees, and the observable visual field is illuminated brightly.

As described above, when the zoom handle 502 is rotated for observation at low or high magnification, the synchronizing variable-power mechanism 71 causes the cylindrical groove cam 51a of the variable-power drive mechanism 51 to move the movable lens 12b according to the degree of movement of the movable lenses 501c and 501d by the cylindrical groove cam 61a of the zooming drive mechanism 61, thereby zoom-varying the area of illumination.

Thus, the movement of the movable lens 12b of the illuminating optical system 12 of the variable-power illuminating mechanism 50 is synchronized with the zoom-power-varying operation of the zoom optical system 501 performed according to the rotation of the zoom handle 502 of the zoom mirror 5. This makes it possible to automatically set the optimum illumination for the zooming magnification set by the zoom optical system 501, that is, the illumination area optimal for the specimen 2. It provides an observer with a state of an observation mirror ensuring illuminating visual field and brightness that are always adequate regardless of changes in zooming magnification. This eliminates the need for a conventional operation in which, each time one power of magnification is changed to another, an observer needs to manually operate an illuminating handle in order to secure illumination optimal for the set magnification. Accordingly, the microscope according to the fourth embodiment significantly reduces operating time and also greatly improves observation efficiency. In addition, since the rotation of the cylindrical groove cam 61a caused by the rotation of the zoom handle 502 is further transmitted to the cylindrical groove cam 51a at a side of the variable-power illuminating mechanism 50 by the timing belt 71c, illuminating light can be finely adjusted according to magnification. Further, since the cylindrical groove cam 61a at the side of the zoom mirror 5 and the cylindrical groove cam 51a at the side of the variable-power illuminating mechanism 50 are connected by the timing belt 71c, the configuration is simple and less costly.

In the fourth embodiment, the cylindrical groove cams 61a and 51a are connected by the timing belt 71c extending between the gears 71b and 71a. However, they may be connected using only gears or other rotation transmission units.

Fifth Embodiment

Figure 7:
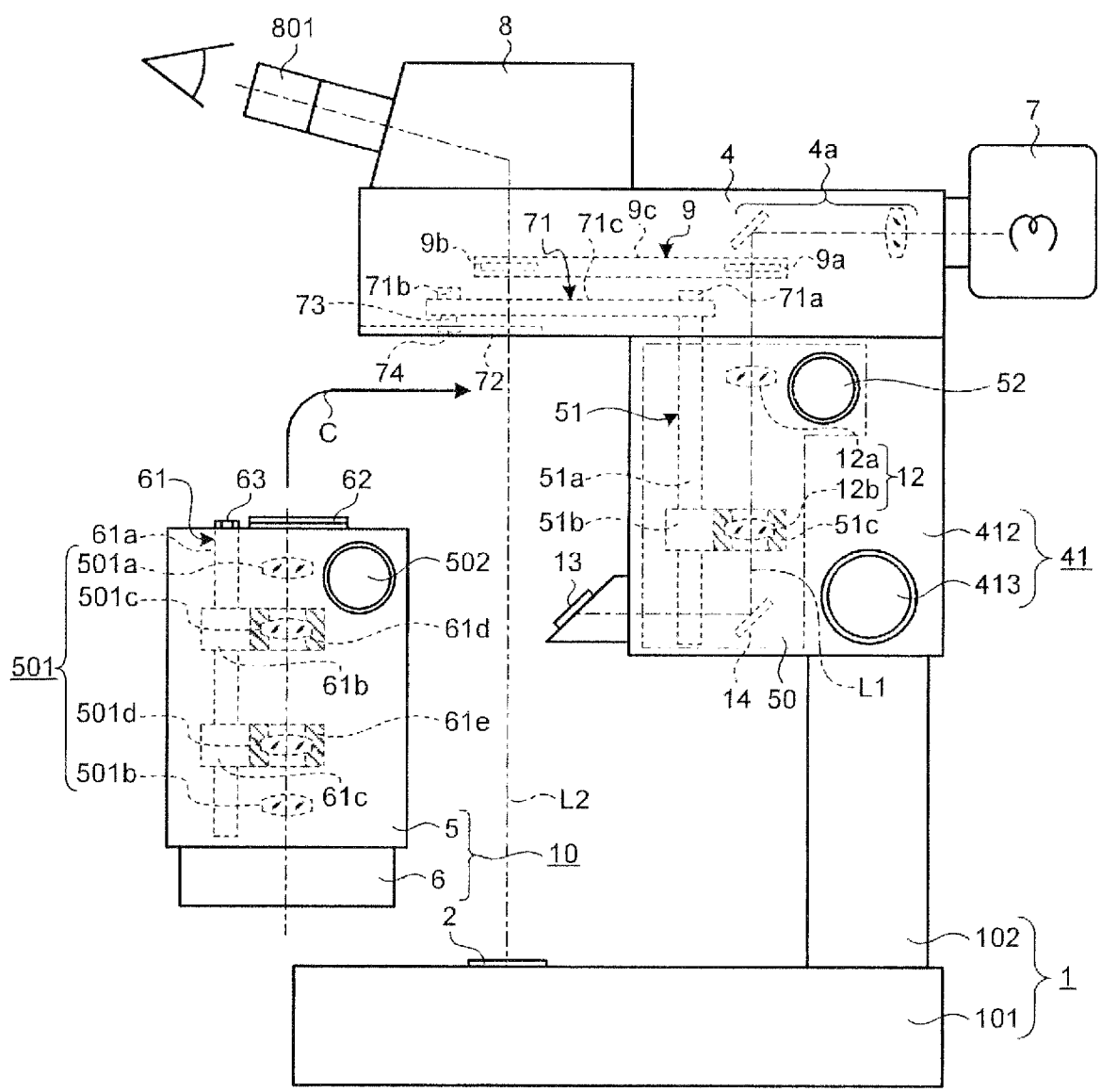
FIG. 7 is a view schematically showing a configuration of a stereoscopic microscope according to a fifth embodiment.

Next, the fifth embodiment according to the present invention will be explained. FIG. 7 is a view schematically showing the configuration of a stereoscopic microscope according to the fifth embodiment of the present invention. Reference numerals identical to FIG. 4 are used in the description of components or the like that are also identical to those shown in FIG. 4, and explanations thereof are not repeated.

Figure 8A:
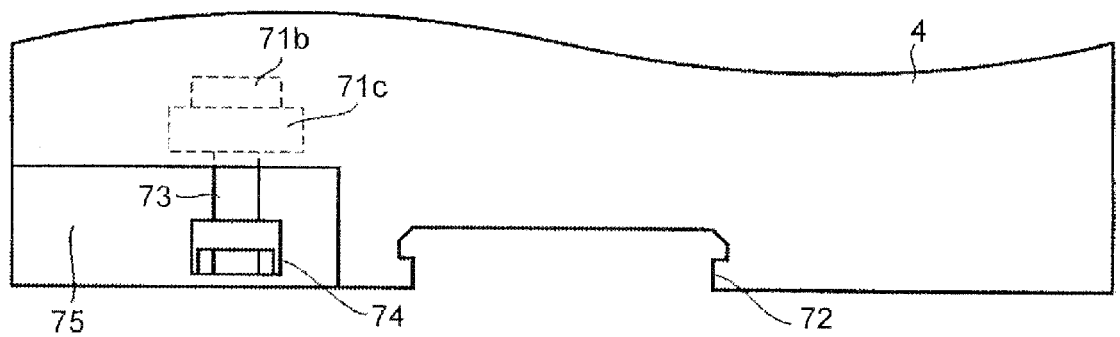
FIG. 8A is an enlarged view of a configuration of a main part at a side of a light-projecting tube shown in FIG. 7.
Figure 9A:
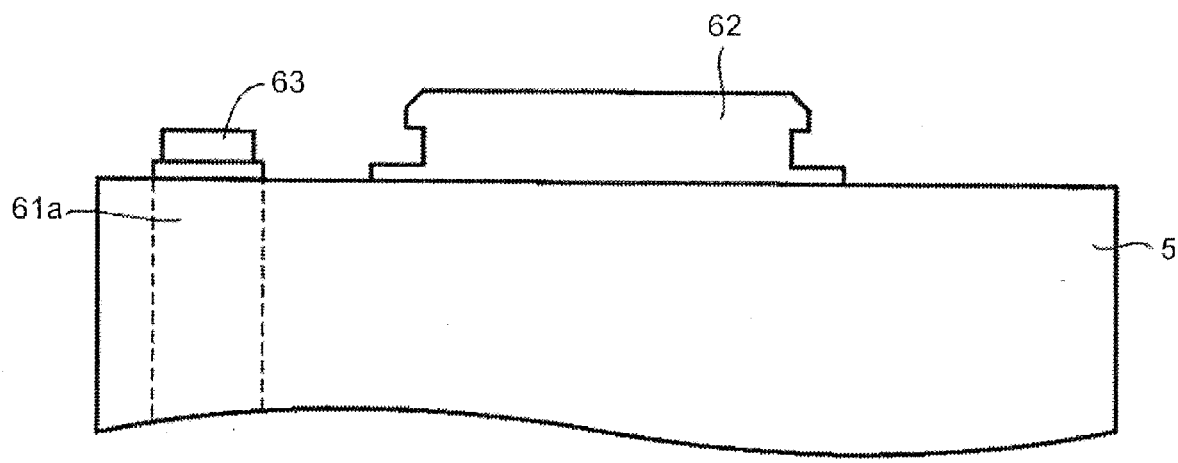
FIG. 9A is an enlarged view of a configuration of a main part at a side of a zoom mirror shown in FIG. 7.
Figure 10:
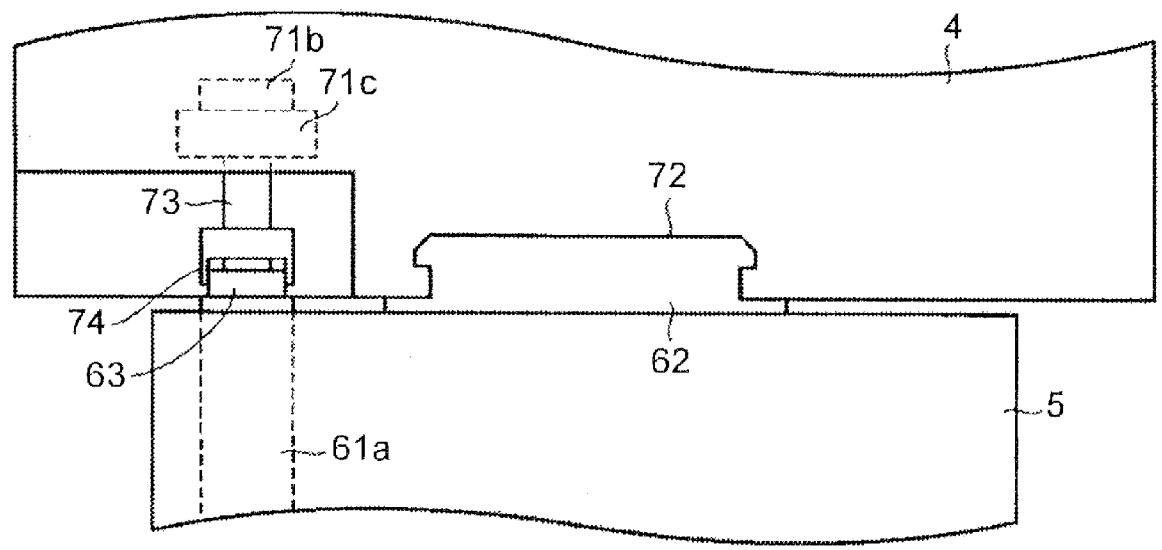
FIG. 10 is an enlarged view of the connecting part between the zoom mirror and the light-projecting tube shown in FIG. 7.

A zoom mirror 5 attached to the underside of the leading end of a light-projecting tube 4 is detachable therefrom. As shown in FIG. 8A, a female dovetail 72 is formed in the underside of the leading end of the light-projecting tube 4. Also, as shown in FIG. 9A, a male dovetail 62 corresponding to the female dovetail 72 at the side of the light-projecting tube 4 is formed on the zoom mirror 5. The zoom mirror 5 can be attached to the underside of the leading end of the light-projecting tube 4, as shown in FIG. 10, by sliding and pushing the male dovetail 62 into the female dovetail 72 in the direction of arrow C from the front of the microscope, as shown in FIG. 7.

Figure 8B:
FIG. 8B is a front view of a connecting member shown in FIG. 8A.

As shown in FIG. 8A, the light-projecting tube 4 has in its hollow a shaft 73 connected to a gear 71b. The shaft 73 is located on a line extending from a cylindrical cam groove 61a disposed in the zoom mirror 5. At one end of the shaft 73 is a disk-shaped connecting member 74. The connecting member 74 has a U-shaped groove 74a in its end face, as shown in FIG. 8B. Such a connecting member 74 is exposed within a notch 75 formed in the underside of the leading end of the light-projecting tube 4.

Figure 9B:
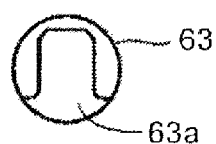
FIG. 9B is a front view of the connecting member shown in FIG. 9A.

On the other hand, the zoom mirror 5 has a disk-shaped connecting member 63 attached to the leading end of the cylindrical groove cam 61a, as shown in FIG. 9A. The connecting member 63 has a U-shaped projection 63a on its end face, as shown in FIG. 9B. The U-shaped projection 63a can be connected to the U-shaped groove 74a of the connecting member 74 by its being slid and pushed therein. Such a connecting member 63 slightly projects from the face of the zoom mirror 5, which face is to be attached to the underside of the light-projecting tube 4.

Specifically, to attach the zoom mirror 5 to the light-projecting tube 4 in such a configuration, the male dovetail 62 of the zoom mirror 5 is made to correspond with the female dovetail 72 of the light-projecting tube 4 from the front of the microscope, and the zoom mirror 5 is slid and pushed inward in the direction of arrow C shown in FIG. 7. In this way, the zoom mirror 5 is positioned in relation to the light-projecting tube 4 by the insertion of the male dovetail 62 into the female dovetail 72. Accordingly, by aligning the projection 63a of the connecting member 63 with the groove 74a of the connecting member 74 in the direction of the movement of zoom mirror 5, the projection 63a of the connecting member 63 can be inserted into the groove 74a of the connecting member 74 as the zoom mirror 5 is being slid.

Consequently, as shown in FIG. 10, the zoom mirror 5 is attached to the underside of the leading end of the light-projecting tube 4 and, at the same time, the cylindrical groove cam 61a of the zoom mirror 5 is connected to the shaft 73 via the connecting members 63 and 74. When a power-varying operation is performed in this state by rotating the zoom handle 502 and hence the cylindrical groove cam 61a, the rotation of the cylindrical groove cam 61a is transmitted to the timing belt 71c via the gear 71b, and then to the cylindrical groove cam 51a via the gear 71a. Thus, illumination optimal for the zooming magnification set by the zoom optical system 501 in a manner similar to that described in the fourth embodiment is automatically set.

On the other hand, to detach the zoom mirror 5 from the light-projecting tube 4, the projection 63a of the connecting member 63 and the groove 74a of the connecting member 74 are aligned with the direction in which the zoom mirror 5 is moved, then the male dovetail 62 of the zoom mirror 5 is pulled out from the female dovetail 72 of the light-projecting tube 4.

However, such a microscope in which the zoom mirror 5 is attachable to the light-projecting tube 4 in the above-described manner may have a problem in that it is difficult to provide the optimum illuminating state by the variable-power illuminating mechanism 50 for the zooming magnification set by the zoom mirror 5. However, in order to avoid this problem, for example, the U-shaped projection 63a of the connecting member 63 and the U-shaped groove 74 of the connecting member 74 are formed so as to align with each other when the lowest zooming magnification is set in the zoom mirror 5 and the illuminating state optimal for the lowest zooming magnification has been set in the variable-power illuminating mechanism 50 by rotating the illuminating handle 52 (see FIG. 7). This makes it possible to match the zooming magnification with the optimum illuminating state simply by inserting the connecting member 63 of the zoom mirror 5 into the other connecting member 74.

Therefore, the configuration in which the zoom mirror 5 is attachable to or detachable from the light-projecting tube 4 via the connecting mechanism composed of the shaft 73 and connecting members 63 and 74 allows for various separate adjustments of the zoom mirror 5 and the variable-power illuminating mechanism 50 during their assembly. This facilitates assembly and improves fine adjustment, in comparison with a conventional microscope in which adjustments are made to the zoom mirror 5 and variable-power illuminating mechanism 50 together. In addition, as the zoom mirror 5 can be detached as necessity requires, the microscope provides the advantage of easy conveyance for installation, and fitting into even small installation spaces.

Sixth Embodiment

Figure 11A:
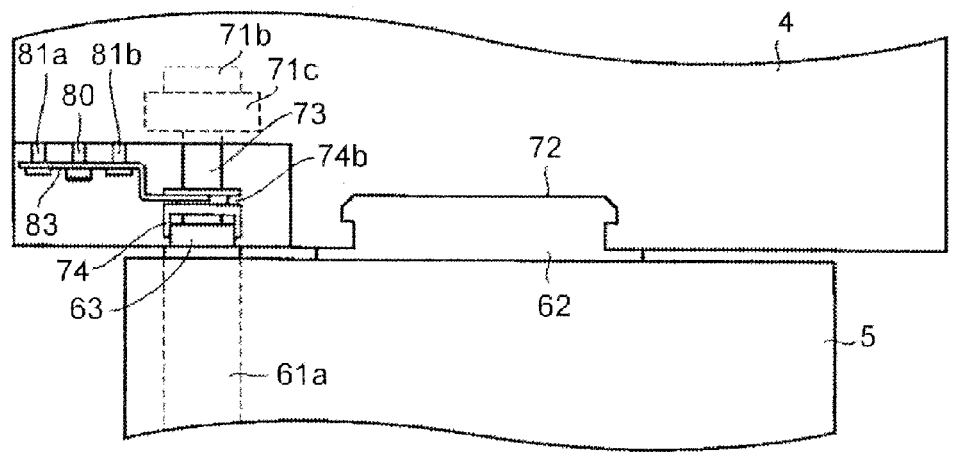
FIG. 11A is an enlarged view of a connecting part between a zoom mirror and a light-projecting tube of a stereoscopic microscope according to a sixth embodiment of the present embodiment.
Figure 11B:
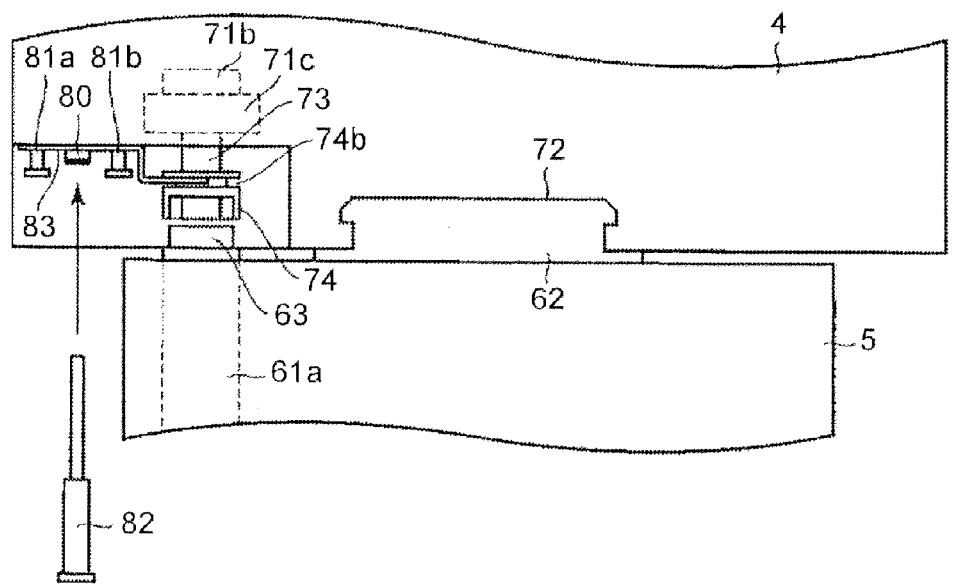
FIG. 11B is another enlarged view of the connecting part between the zoom mirror and the light-projecting tube of the stereoscopic microscope according to the sixth embodiment of the present embodiment.
Figure 11C:
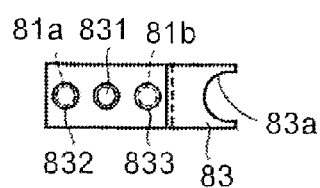
FIG. 11C is a front view of a bracket shown in FIG. 11A.

The sixth embodiment of the present invention will now be described below. FIG. 11A to FIG. 11C are views schematically showing the configuration of main parts of a stereoscopic microscope according to the sixth embodiment of the present invention. Reference numerals identical to FIG. 5 are used in the description of components or the like that are identical to those shown in FIG. 5, and explanations thereof are not repeated.

In this case, a slit 74b is formed in the circumference of a disk-shaped connecting member 74 attached to a shaft 73.

A light-projecting tube 4 has a bracket 83. As shown in FIGS. 11A and 11C, the bracket 83 has a leading end bent in an L-shape and a U-shaped notched portion 83a. The notched portion 83a is inserted in the slit 74b of the connecting member 74. Additionally, the bracket 83 has a screw hole 831 made in the basal end thereof, and holes 832 and 833 with the screw hole 831 between them. Pins 81a and 81b extending upright in the light-projecting tube 4 are inserted in the holes 832 and 833 respectively. Also, a screw 80 screwed into the light-projecting tube 4 is inserted in the screw hole 831. This allows the bracket 83 to vertically move along the pins 81a and 81b by its weight and according to the tightness of the screw 80 to move the connecting member 74 vertically. Specifically, as shown in FIG. 11A, while the connecting member 74 at the side of the light-projecting tube 4 is kept connected to the connecting member 63 at the side of the zoom mirror 5, the screw 80 is loosened to the maximum such that the bracket 83 is in contact with the leading ends of the pins 81a and 81b by its weight. As the screw 80 is tightened, on the other hand, the bracket 83 is moved upward along the pins 81a and 81b. Consequently, the connecting member 74 is also moved upward and disconnected from the connecting member 63, as shown in FIG. 11B.

To be more specific, as the screw 80 is tightened with a driver 82, as shown in FIG. 11B, from the state in which the connecting members 63 and 74 are connected (i.e., the state in which the cylindrical groove cam 61a of the zoom mirror 5 is connected with the shaft 73 via the connecting members 63 and 74), the bracket 83 is moved upward along the pins 81a and 81b on account of the disconnecting mechanism composed of the bracket 83, screw 80, and pins 81a and 81b, and consequently the connecting member 74 is moved upward and disconnected from the connecting member 63. This makes it possible to disconnect the connecting members 63 and 74 from each other by adjusting the tightness of the screw 80 while the zoom mirror 5 is kept attached to the light-projecting tube 4; accordingly, with the zoom mirror 5 attached, the illuminating state of the variable-power illuminating mechanism 50 can be adjusted as necessity requires. Needless to say, the reverse operation to that described above, that is, the operation of loosening the screw 80, allows the bracket 83 to move downward by its weight until it comes into contact with the leading ends of the pins 81a and 81b; therefore, the connecting member 74 can be connected to the connecting member 63 again.

Incidentally, in the above-described disconnecting mechanism, it is assumed that the connecting member 74 moves by its weight. However, in order to smoothly move the connecting member 74 in the direction of gravitation, a downward elastic force may be constantly exerted on the connecting member 74 by attaching an elastic member, such as a spring, to the side of the shaft 73.

It is to be understood that the present invention is not limited to the embodiments described above but various changes and modifications may be made without departing from the spirit and scope of the invention.

Further, the foregoing embodiments include various stages of the present invention, and various inventions can be made by suitable combinations of the composing elements disclosed therein. For example, even if some of the composing elements disclosed in the above-described embodiments are omitted, the problems discussed in PROBLEMS TO BE SOLVED BY THE INVENTION can be overcome.

According to the invention, a microscope that is small but excels in operability and workability can be provided.

INDUSTRIAL APPLICABILITY

As described above, the microscope according to the present invention is useful for microscopes designed to observe a specimen via a zoom optical system having variable zoom power, especially for fluorescent microscopes designed to observe fluorescence emitted from a specimen mounted on a stage.

The invention claimed is:

1. A microscope comprising:
an observation optical unit that includes a zoom optical system having variable zoom power and an objective lens optically connected to the zoom optical system, the observation optical unit receiving observation light emitted from an observation sample;
a focusing unit that includes a focusing mechanism to focus the observation optical unit on the observation sample;
a light source unit that emits illuminating light to illuminate the observation sample; and
an illuminating unit that includes a reflecting optical element which is disposed in the observation optical unit but out of an optical path of the zoom optical system,
wherein at least one part of the illuminating unit is disposed in the focusing unit, and the reflecting optical element of the illuminating unit is entirely disposed in the observation optical unit and outside the focusing unit, and
wherein the illuminating unit is adapted to illuminate the observation sample with the illuminating light via the reflecting optical element and the objective lens.

2. The microscope according to claim 1, further comprising:
a microscope main body that holds the observation optical unit such that the observation optical unit is freely attachable and detachable in a direction perpendicular to an optical axis of the objective lens.

3. The microscope according to claim 1, wherein:
the observation sample includes a fluorescent substance, and
the illuminating unit illuminates the observation sample with the illuminating light that excites the fluorescent substance.

4. The microscope according to claim 1, further comprising:
a post member that is disposed upright in a direction of focusing of the observation optical unit by the focusing unit, the post member supporting the focusing unit such that the focusing unit is freely movable in the direction of focusing,
wherein the illuminating unit is partially disposed in the focusing unit so as to be parallel to the post member.

5. The microscope according to claim 1, further comprising:
a post member that has a hollow inside and is disposed upright in a direction of focusing of the observation optical unit by the focusing unit, the post member supporting the focusing unit such that the focusing unit is freely movable in the direction of focusing,
wherein the illuminating unit is partially disposed in the focusing unit so as to be in the hollow.

6. The microscope according to claim 5, wherein:
the hollow is a hollow groove that is formed in the direction in which the post member is disposed upright, and
the illuminating unit is partially disposed in the focusing unit so as to be in the hollow groove.

7. The microscope according to claim 1, further comprising:
a post member that has a long through-hole formed so as to be perpendicular to a direction of focusing of the observation optical unit by the focusing unit and so as to extend in the direction of focusing, the post member being disposed upright in the direction of focusing and supporting the focusing unit such that the focusing unit is freely movable in the direction of focusing,
wherein the illuminating unit is partially disposed in the focusing unit so as to be in the long through-hole.

8. The microscope according to claim 1, further comprising:
a synchronizing variable-power mechanism that is synchronized with a zoom-power-varying operation of the zoom optical system to vary a power for an area of illumination of the illuminating light by the illuminating unit.

9. The microscope according to claim 8, wherein:
the observation optical unit includes a zooming drive mechanism that zoom drives the zoom optical system, thereby causing the zoom optical system to perform the zoom-power-varying operation,
the illuminating unit includes a variable-power lens system that varies the power for the area of the illumination, and a variable-power drive mechanism that variable-power drives the variable-power lens system, wherein the variable-power drive mechanism causes the variable-power lens system to perform a power-varying illumination operation, and
the synchronizing variable-power mechanism is connected to the zooming drive mechanism and the variable-power drive mechanism, and is synchronized with a zooming drive operation of the zooming drive mechanism in the zoom optical system to thereby cause the variable-power drive mechanism to variable-power drive the variable-power lens system.

10. The microscope according to claim 9, wherein:
the zoom optical system includes a zoom movable lens that is movable in a direction of an optical axis of the zoom optical system,
the variable-power lens system includes a variable-power movable lens that is movable in a direction of an optical axis of the variable-power lens system,
the zooming drive mechanism moves the zoom movable lens, thereby causing the zoom optical system to perform the zoom-power-varying operation,
the variable-power drive mechanism moves the variable-power movable lens, thereby causing the variable-power lens system to perform the power-varying illumination operation, and the synchronizing variable-power mechanism causes the variable-power drive mechanism to move the variable-power movable lens according to a degree of movement of the zoom movable lens by the zooming drive mechanism.

11. The microscope according to claim 9, further comprising:

a microscope main body that holds the observation optical unit such that the observation optical unit is freely attachable and detachable in a direction perpendicular to an optical axis of the objective lens, and a connecting mechanism that is disposed between the synchronizing variable-power mechanism and the zooming drive mechanism: (i) to connect the zooming drive mechanism to the synchronizing variable-power mechanism upon attachment of the observation optical unit to the microscope main body, to transmit the zooming drive operation of the zooming drive mechanism to the synchronizing variable-power mechanism, and (ii) to disconnect the zooming drive mechanism from the synchronizing variable-power mechanism upon separation of the observation optical unit from the microscope main body.

12. The microscope according to claim 9, further comprising:

a connecting mechanism that is disposed between the synchronizing variable-power mechanism and the zooming drive mechanism to connect the zooming drive mechanism to the synchronizing variable-power mechanism, to transmit the zooming drive operation of the zooming drive mechanism to the synchronizing variable-power mechanism, and a disconnecting mechanism that releases the connection between the zooming drive mechanism and the synchronizing variable-power mechanism by the connecting mechanism.

13. A microscope comprising:

an observation optical unit that includes a zoom optical system having variable zoom power and an objective lens optically connected to the zoom optical system, the observation optical unit receiving observation light emitted from an observation sample;

a focusing unit that includes a focusing mechanism to focus the observation optical unit on the observation sample;

a light source unit that emits illuminating light to illuminate the observation sample;

an illuminating unit that includes a reflecting optical element which is disposed in the observation optical unit but out of an optical path of the zoom optical system, wherein at least one part of the illuminating unit is disposed in the focusing unit and the reflecting optical element of the illuminating unit is entirely disposed in the observation optical unit and outside the focusing unit, and wherein the illuminating unit is adapted to illuminate the observation sample with the illuminating light via the reflecting optical element and the objective lens;

a microscope main body that holds the observation optical unit such that the observation optical unit is freely attachable and detachable in a direction perpendicular to an optical axis of the objective lens; and a post member that is disposed upright in a direction of focusing of the observation optical unit by the focusing unit, the post member supporting the focusing unit such that the focusing unit is freely movable in the direction of focusing;

wherein the observation sample includes a fluorescent substance; and wherein the illuminating unit illuminates the observation sample with the illuminating light that excites the fluorescent substance, and the illuminating unit is partially disposed in the focusing unit so as to be parallel to the post member.

* * * * *